(12) United States Patent
Hirschburger (10) Patent No.: US 9,539,691 B2
(45) Date of Patent: Jan. 10, 2017

(54) HAND-POWER TOOL (75) Inventor: Wolfgang Hirschburger, Reutingen (DE)

(73) Assignee: Robert Bosch GmbH, Stuttgart (DE)

( * ) Notice: Subject to any disclaimer, the term of this patent is extended or adjusted under 35 U.S.C. 154(b) by 60 days.

(21) Appl. No.: 14/125,524

(22) PCT Filed: Apr. 26, 2012

(86) PCT No.: PCT/EP2012/057643
§ 371 (c)(1),
(2), (4) Date: Mar. 28, 2014

(87) PCT Pub. No.: WO2012/171697
PCT Pub. Date: Dec. 20, 2012

(65) Prior Publication Data
US 2014/0198486 A1 Jul. 17, 2014

(30) Foreign Application Priority Data
Jun. 14, 2011 (DE) .................. 10 2011 077 440

(51) Int. Cl.
*B23Q 17/24* (2006.01)
*B25F 5/02* (2006.01)

(52) U.S. Cl.
CPC ............ *B23Q 17/2404* (2013.01); *B25F 5/02* (2013.01); *B25F 5/021* (2013.01)

(58) Field of Classification Search
CPC ................................ B23Q 17/2404; B25F 5/02
See application file for complete search history.

(56) References Cited

U.S. PATENT DOCUMENTS

| 5,525,842 A | 6/1996 | Leininger |
| 2008/0074865 A1 | 3/2008 | Lutz et al. |
| 2010/0206429 A1 | 8/2010 | Pozgay et al. |
| 2010/0214768 A1* | 8/2010 | Dixon ............... B25F 5/021 362/119 |
| 2011/0188232 A1* | 8/2011 | Friedman ........... B25B 23/18 362/119 |
| 2012/0191250 A1* | 7/2012 | Iwata ............... H02P 6/06 700/275 |
| 2012/0199372 A1* | 8/2012 | Nishikawa ........ B25B 23/1475 173/132 |

FOREIGN PATENT DOCUMENTS

| CN | 101722506 A | 6/2010 |
| CN | 201685236 U | 12/2010 |
| EP | 1 072 842 A2 | 1/2001 |
| EP | 2 223 783 A1 | 9/2010 |

OTHER PUBLICATIONS

International Search Report corresponding to PCT Application No. PCT/EP2012/057643, mailed Jul. 31, 2012 (German and English language document) (7 pages).

* cited by examiner

*Primary Examiner* — Elmito Breval
(74) *Attorney, Agent, or Firm* — Maginot, Moore & Beck LLP (57) ABSTRACT

A hand-power tool includes at least one tool spindle and a drive unit configured to drive the tool spindle at a rotational speed greater than 10,000 min$^{-1}$. The hand-power tool further includes at least one lighting unit that has at least two lighting mechanisms that are configured to illuminate a work area. The lighting mechanisms are arranged on an axial plane of the tool spindle at an angle of less than 125 degrees relative to each other with respect to the tool spindle.

15 Claims, 8 Drawing Sheets

HAND-POWER TOOL

This application is a 35 U.S.C. §371 National Stage Application of PCT/EP2012/057643, filed on Apr. 26, 2012, which claims the benefit of priority to Serial No. DE 10 2011 077 440.8, filed on Jun. 14, 2011 in Germany, the disclosures of which are incorporated herein by reference in their entirety.

BACKGROUND

The disclosure is based on a hand-held power tool.

A hand-held power tool having at least one tool spindle and a drive unit which is provided for driving the tool spindle at a rotational speed higher than 10 000 $min^{-1}$, and having at least one lighting unit which has at least two lighting means which are provided for illuminating a work area has already been proposed.

SUMMARY

The disclosure is based on a hand-held power tool having at least one tool spindle and a drive unit which is provided for driving the tool spindle with a rotational speed higher than 10 000 $min^{-1}$, and having at least one lighting unit which has at least two lighting means which are provided for illuminating a work area.

It is proposed that the lighting means are arranged at an angle of less than 125 degrees with respect to one another in relation to the tool spindle on an axial plane of the tool spindle. A "tool spindle" is to be understood in particular as meaning a shaft which during operation transmits a torque to a tool clamping chuck of the hand-held power tool. The tool spindle preferably transmits the torque directly to the tool clamping chuck. The tool spindle is advantageously connected to the tool clamping chuck in a rotationally-fixed fashion. The tool spindle is preferably permanently connected to the tool clamping chuck in the axial direction. In particular, a "drive unit" is to be understood as meaning a unit which during operation drives in rotation an inserted tool which is attached in the tool clamping chuck. The drive unit advantageously converts the electrical energy into rotational energy. The drive unit preferably has an electric motor with maximum power between 15 watts and 150 watts, preferably between 20 watts and 100 watts. In particular, "maximum power" is to be understood to be the maximum power which the drive unit takes up to drive the tool spindle during operation. The term "provided" is to be understood as meaning, in particular, specially programmed, configured and/or equipped. In particular, a "rotational speed" is to be understood as meaning a characteristic variable which specifies a rotational speed of the tool spindle about a rotational axis of the tool spindle. The drive unit advantageously drives the tool spindle at a rotational speed higher than 15 000 $min^{-1}$, particularly advantageously higher than 20 000 $min^{-1}$. A "lighting unit" is to be understood as meaning, in particular, a unit having at least two lighting means and at least one optical system. The lighting unit preferably has a lighting means carrier which is provided for connecting the lighting means at least mechanically. The lighting means carrier advantageously makes electrical contact with the lighting means. In particular, the lighting means carrier is embodied as a printed circuit board. In particular, an energy source and/or an electrical connection which connects the lighting means carrier to an accumulator, to the energy source and/or to an electronic system is not to be part of the lighting unit. A "lighting means" is to be understood in particular as meaning a means which during operation emits a luminous flux. The luminous flux of the lighting means advantageously has at least a wavelength which is visible to an operator. The lighting means is preferably embodied as a lighting means which appears appropriate to the person skilled in the art, but preferably as a light emitting diode. The lighting unit preferably has at least one light emitting diode which emits a white light. In particular, the lighting unit has at least three lighting means, advantageously at least four lighting means, and particularly advantageously more than four lighting means. In particular, a "work area" is to be understood as meaning an area relative to the lighting unit which is arranged at a distance of less than 20 mm from an area in which during operation workpiece processing takes place. The work area is advantageously arranged on a side of the tool spindle facing away from the drive unit. The term "illuminate" is to be understood in this context as meaning, in particular, that the lighting unit irradiates a workpiece arranged in the work area with at least partially more than 10 lux, advantageously more than 100 lux, and particularly advantageously more than 500 lux. In particular, an "axial plane of the tool spindle" is to be understood as meaning a plane which is oriented perpendicularly with respect to the rotational axis of the tool spindle. At an "angle with respect to the tool spindle" is to be understood as meaning, in particular, an angle which is arranged between two beams which start at the rotational axis of the tool spindle and each intersect one of the lighting means. In particular, the beams are arranged on the axial plane. The lighting means are preferably at an equal distance from the rotational axis of the tool spindle. That is to say the lighting means are arranged on a ring around the tool spindle. The lighting means are preferably arranged symmetrically around the tool spindle. As a result of the inventive configuration of the hand-held power tool, a work area can advantageously be illuminated uniformly, as a result of which particularly comfortable work is possible.

In a further configuration it is proposed that the lighting unit surrounds the tool spindle by more than 90 degrees on at least one plane, as a result of which easy mounting of a plurality of lighting means which are arranged spaced apart is possible. In particular, the term "surround by more than 90 degrees on at least one plane" is to be understood as meaning that beams which start from the rotational axis of the tool spindle intersect the lighting unit in an angular range of more than 90 degrees, said beams being oriented radially with respect to the rotational axis on the plane. The lighting unit advantageously surrounds the tool spindle over more than 180 degrees, and particularly advantageously over more than 270 degrees. The lighting means carrier of the lighting unit preferably surrounds the tool spindle by more than 90 degrees on at least the plane.

Furthermore, it is proposed that the lighting unit has at least one delay unit which is provided for delaying switching off the lighting unit by a provided time after switching off the drive unit, as a result of which particularly comfortable work is possible. In particular, the workpiece can be illuminated easily for viewing between two working processes. The delay unit is preferably embodied as a unit which appears appropriate to a person skilled in the art, but preferably as a computing routine of a microcontroller. The term "switching off the drive unit" is to be understood as meaning, in particular, a time at which the drive unit stops driving the tool spindle, in particular owing to an operator input. The term "switching off the lighting unit" is to be understood as meaning, in particular, a time at which the lighting unit stops emitting a luminous flux. The lighting unit is preferably provided for reducing the emitted luminous flux over a perceptible time period, in particular over more than 0.5 seconds, until it is extinguished completely. The time period preferably starts a perceptible time after the switching off of the drive unit. The lighting unit advantageously reduces the luminous flux continuously. In particular, a "provided time" is to be understood as meaning a time which was selected when the delay unit was developed and/or by an operator control action.

In addition it is proposed that the lighting unit has at least one optical element which is provided for scattering a light beam of at least one of the lighting means, as a result of which illumination can be achieved which is particularly low in shadows and uniform. In particular, the term "optical element" is to be understood as meaning an element which is provided for deflecting light which is emitted by the lighting means and/or reflecting light which is emitted by the lighting means in one direction. The lighting unit preferably has one optical element per lighting means. Alternatively or additionally, the lighting unit could have an optical element, in particular a diffuser, which influences the luminous flux of a plurality of lighting means. The term "scatter a light beam" is intended to mean, in particular, that the optical element is provided for widening an angle of aperture of the luminous flux of the lighting means. An "angle of aperture" is to be understood as meaning, in particular, an angle at which 90% of the energy of the luminous flux is emitted. A maximum of the luminous flux is preferably oriented in the direction of the work area.

In addition it is proposed that the lighting unit has an optical element which is provided for attaching at least one housing element, as a result of which it is possible to dispense in a structurally simple way with other attachment elements, in particular with screws. In particular, the term "attach a housing element" is to be understood as meaning that in at least one operating state the optical element applies a force to a housing element which counteracts a movement of the housing element relative to another housing element. A hand-held power tool housing of the hand-held power tool preferably has at least two housing elements. The two housing elements are preferably embodied as half-shells. The optical element preferably attaches at least the two housing elements to one another. A "hand-held power tool housing" is to be understood as meaning, in particular, a unit which attaches at least the tool spindle and part of the drive unit in such a way that they cannot move relative to one another. The hand-held power tool housing preferably surrounds at least the tool spindle and the drive unit on at least one plane. The hand-held power tool housing is composed from a material which appears appropriate to a person skilled in the art, but preferably from a plastic.

In one advantageous embodiment of the disclosure it is proposed that the lighting means are provided for emitting light with different colors, as a result of which the operator can be provided with information without having to avert his gaze from an illuminated workpiece. The term "emit light with different colors" is intended to mean, in particular, that in two operating states the luminous fluxes have spectra which can be differentiated by an operator. For example, the one lighting means could be provided for emitting a white luminous flux and the other lighting means could be provided for emitting a red and/or green luminous flux. Alternatively or additionally, at least one of the lighting means could be embodied as an RGB light emitting diode. The lighting means is preferably provided for illuminating the work area in color. Alternatively or additionally, the lighting means could be provided for emitting light from the hand-held power tool housing on a side of the hand-held power tool housing facing away from the tool axis, to be precise, in particular, at least partially perpendicularly with respect to the rotational axis of the tool spindle. For example, the lighting unit could have a lighting ring which surrounds the rotational axis in a circular shape between a gripping region of the hand-held power tool housing and a workpiece side and at the same time, in particular, does not illuminate the workpiece.

Furthermore it is proposed that the hand-held power tool comprises a display unit which is embodied at least partially in one piece with the lighting unit, as a result of which characteristic variables of the hand-held power tool can be displayed to the operator in a structurally simple way. In particular, a "display unit" is to be understood as meaning a unit which is provided for displaying at least one characteristic variable to an operator in at least one operating state. A "characteristic variable" is to be understood as meaning, in particular, an information carrier which has at least one information item about a state of the hand-held power tool which appears appropriate to a person skilled in the art, but preferably an information item about an accumulator state, about the temperature of an accumulator, about the temperature of the motor, about the temperature of an electronics system, about a rotational speed of the tool spindle and/or about a contact pressure of an inserted tool. For example, the display unit could illuminate the work area in white in a normal operating state, illuminate the work area in yellow when there is a low accumulator charge and/or illuminate it in red in the case of overheating of the accumulator, of the electric motor and/or of an electronics system. Alternatively, the display unit could output a color of the illumination as a function of a pressure transmitted to the inserted tool. Preferably, a binary information item which only describes whether the inserted tool is switched on or switched off is not to be understood as a characteristic variable. In particular, the term "at least partially in one piece" is to be understood as meaning that at least one component of the lighting unit performs a function of displaying the characteristic variable as well as a function of illuminating the work area. A light beam which is emitted by the lighting unit preferably has at least one property which is dependent on the characteristic variable. Alternatively or additionally, the hand-held power tool could have an output means which is provided for outputting a characteristic variable in a tactile and/or acoustic fashion.

Furthermore, it is proposed that the hand-held power tool has a lithium-based accumulator which is provided for supplying the drive unit with electrical energy, as a result of which a particularly small installation space and a low weight with high efficiency can be achieved. A "lithium-based accumulator" is to be understood as meaning, in particular, an accumulator which stores electrical energy during a charging process by means of a lithium-chemical process. The accumulator preferably has an operating voltage between 3 volts and 15 volts. The accumulator particularly preferably has an operating voltage between 3 volts and 7.6 volts. The accumulator advantageously has a storage capacity between 2 and 25 Wh, and particularly advantageously between 4 and 10 Wh.

In addition it is proposed that the drive unit is connected in a gearless fashion to the tool spindle, as a result of which particularly low unit costs and low wear are possible. In particular, "connected in a gearless fashion" is to be understood as meaning that a rotor of the drive unit and the tool spindle rotate at the same rotational speed during operation.

In addition it is proposed that the hand-held power tool has a hose coupling which connects the drive unit to the tool spindle, as a result of which fabrication tolerances are compensated in a structurally simple fashion and the electric motor can be protected. A "hose coupling" is to be understood as meaning, in particular a tubular, rubber-elastic means which is provided for transmitting a force from the drive unit to the tool spindle. The hose coupling is preferably connected in a frictionally locking fashion to the drive unit and/or the tool spindle. The hose coupling advantageously surrounds the drive unit and/or the tool spindle by 360 degrees on at least one plane. The hose coupling is preferably provided for releasing, in the case of blocking of an inserted tool, a rotationally fixed connection between the drive unit and the tool spindle, in particular in that a frictionally locking connection slips.

BRIEF DESCRIPTION OF THE DRAWINGS

Further advantages are apparent from the following description of the drawing. In the drawing, two exemplary embodiments of the disclosure are illustrated. The drawing, the description and the claims contain numerous features in combination. A person skilled in the art will also expediently consider the features individually and combine them to form appropriate further combinations.

In the drawings.

DETAILED DESCRIPTION

Figure 1:
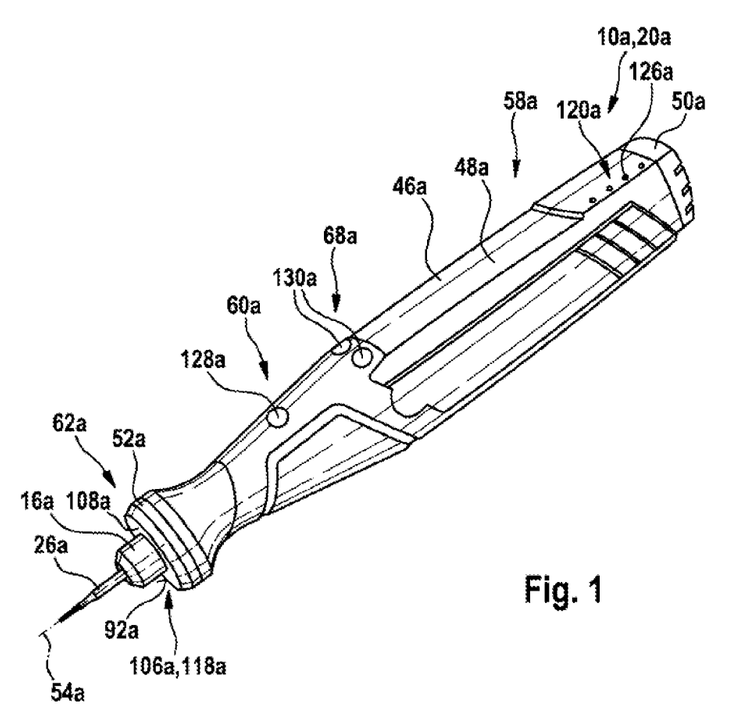
FIG. 1 shows a hand-held power tool according to the disclosure in a perspective illustration.
Figure 2:
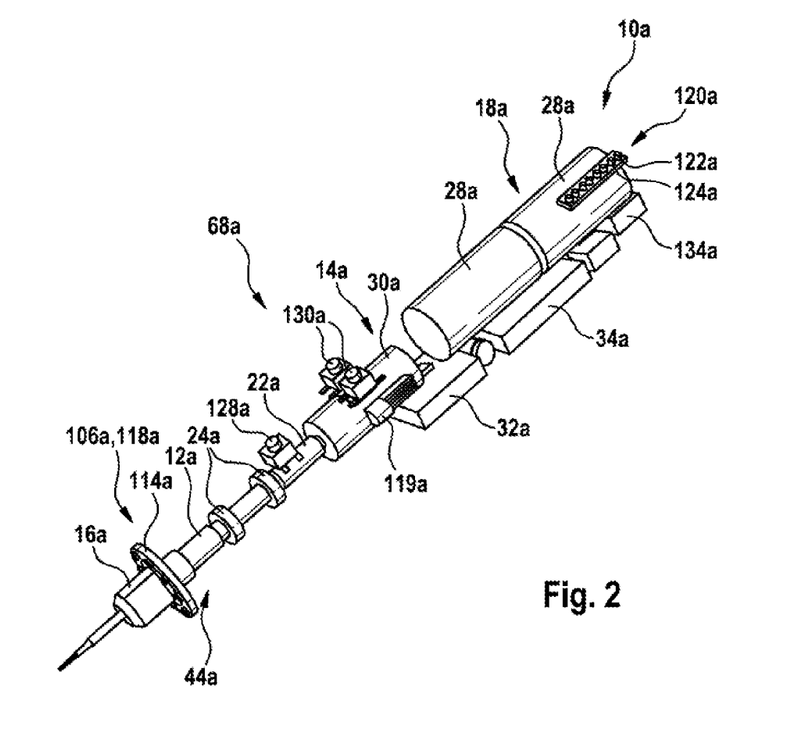
FIG. 2 shows the hand-held power tool from FIG. 1 without a hand-held power tool housing of the hand-held power tool.

FIG. 1 and FIG. 2 show a hand-held power tool 10a according to the disclosure with a tool spindle 12a, a drive unit 14a, a tool clamping chuck 16a, an accumulator 18a and a hand-held power tool housing 20a. The drive unit 14a drives the tool spindle 12a in rotation during the processing of a workpiece. The drive unit 14a is connected in a gearless fashion to the tool spindle 12a. In an operating state, the drive unit 14a drives the tool spindle 12a at a rotational speed higher than 10 000 min$^{-1}$. In this exemplary embodiment, the rotational speed can be adjusted by an operator between 10 000 min$^{-1}$ and 40 000 min$^{-1}$. The hand-held power tool 10a has a hose coupling 22a which, in an operationally ready state, connects a rotor of the drive unit 14a to the tool spindle 12a. The hand-held power tool 10a has two bearings 24a which, in an operationally ready state, support the tool spindles 12a in the hand-held power tool housing 20a. If an inserted tool 26a becomes blocked in the workpiece, a frictionally locking connection of the hose coupling 22a to the drive unit 14a or to the tool spindle 12a slips. The hand-held power tool 10a has a spindle blocking means (not illustrated in more detail) which, in at least one operating state, attaches the tool spindle in a rotationally fixed fashion relative to the hand-held power tool housing 20a. The spindle blocking means has a pushbutton knob which engages in a cutout (not illustrated in more detail) in the tool spindle 12a. Blocking the tool spindle 12a allows the operator to open the tool clamping chuck 16a to change a tool by means of a rotational movement.

In an operationally ready state, the tool clamping chuck 16a attaches the inserted tool 26a. The inserted tool 26a is embodied here as an engraving cutter. Alternatively, the tool clamping chuck 16a could attach, for the purpose of processing a workpiece, a milling cutter, a grinding disk, a grindstone, a polishing tip, a polishing disk, a polishing brush, a cutter disk, a sawblade with a diameter of less than 50 mm and/or a drill with a diameter of less than 5 mm.

The accumulator 18a is based on a lithium-chemical energy storage process. The accumulator 18a has a storage capacity of 6 Wh. In an operationally ready state it makes available a voltage of 7.2 volts. During operation, the accumulator 18a supplies the drive unit 14a with electrical energy. The accumulator 18a has two accumulator cells 28a. The accumulator cells 28a are connected in series.

The drive unit 14a is embodied as an electrically commutated drive unit 14a. The drive unit 14a has a brushless electric motor 30a and a motor driver 32a.

The rotor of the electric motor 30a is embodied internally. During operation, the motor driver 32a supplies the electric motor 30a with energy by means of an alternating voltage. The motor driver 32a has an electronic commutator 36a illustrated in FIG. 3. The commutator 36a has at least one transistor (not illustrated in more detail). During operation, the commutator 36a converts a direct voltage into an alternating voltage in order to transmit energy to a rotor 38a (illustrated in FIG. 3) of the electric motor 30a. In at least one operating state, a frequency of the alternating voltages corresponds to a rotational speed of the rotor 38a. For this purpose, the commutator 36a has a sensor 40a which measures an orientation and/or a rotational speed of the rotor 38a. The sensor 40a measures a rotational speed of the rotor 38a via a coil of the electric motor 30a. A commutator and/or an electric motor could also have another sensor, which appears appropriate to a person skilled in the art, for determining the rotational speed.

Figure 3:
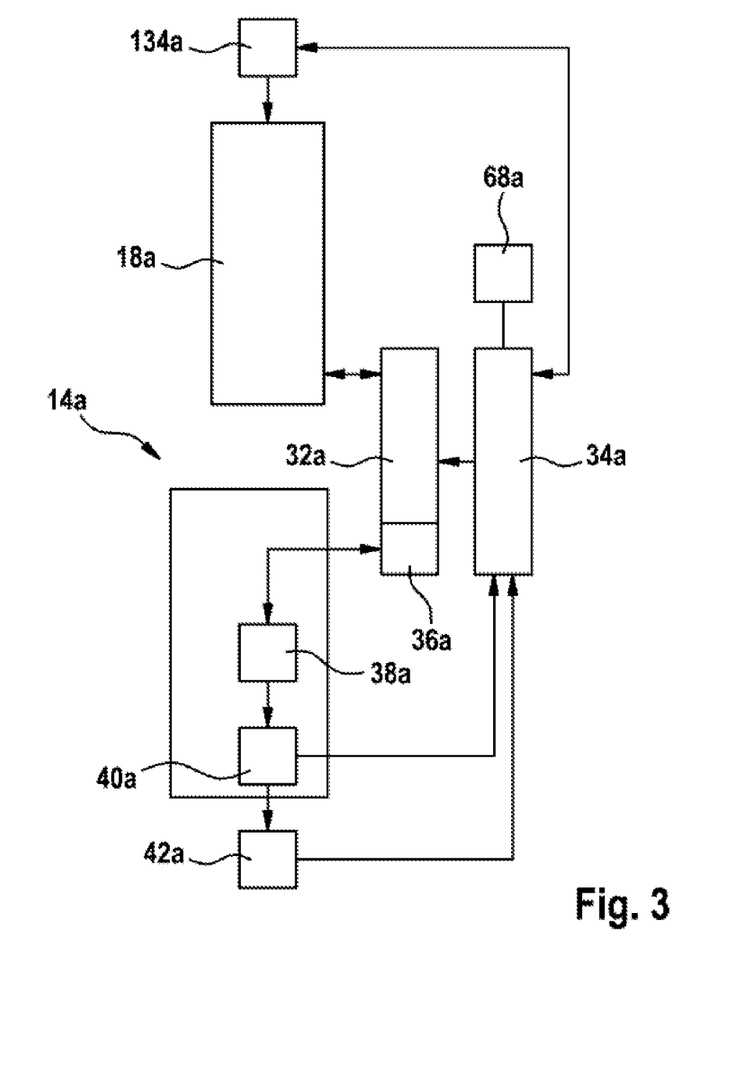
FIG. 3 shows a block circuit diagram of a part of the hand-held power tool from FIG. 1.

As is shown by FIG. 3, the hand-held power tool 10a comprises a computing unit 34a. The computing unit 34a is embodied as a microcontroller. The computing unit 34a regulates, via the motor driver 32a, the alternating voltage with which the motor driver 32a supplies the electric motor 30a. Alternatively, a computing unit could control a direct voltage. Rotational power which is output to the tool spindle 12a by the electric motor 30a is dependent on the alternating voltage of the motor driver 32a. The electric motor 30a takes in a maximum power between 15 watts and 150 watts in order to drive the tool spindle 12a, in this exemplary embodiment a maximum of 40 watts. In this exemplary embodiment, the motor driver 32a and the computing unit 34a are embodied separately. Alternatively, a motor driver and a computing unit could be arranged on a common printed circuit board. Before the tool spindle 12a is driven, the computing unit 34a moves the rotor 38a of the electric motor 30a into a provided starting position. During starting, the computing unit 34a accelerates the rotor 38a in accordance with a provided acceleration function. Here, the computing unit 34a accelerates the rotor 38a linearly.

The drive unit 14a has a sensor 42a which measures an orientation angle and/or a rotational speed of the tool spindle 12a. This sensor 42a is partially connected in a rotationally fixed fashion to the tool spindle 12a. The drive unit 14a therefore has a total of two sensors 40a, 42a for measuring a rotational speed. The computing unit 34a regulates its rotational speed of the tool spindle by means of the sensor 42. The drive unit 14a drives the tool spindle 12a at a rotational speed which can be infinitely adjusted. The computing unit 34a compares a characteristic variable of a rotational speed of the tool spindle 12a with a characteristic variable of a rotational speed of the rotor 38a of the electric motor 30a. Alternatively, a computing unit could link a characteristic variable of a rotational speed of the tool spindle 12a with a characteristic variable of a power consumption of the electric motor 30a. The computing unit 34a detects whether the hose coupling 32a is slipping. In this case, the computing unit 34a brakes the rotor 38a of the electric motor 30a via the motor driver 32a. Furthermore, the computing unit 34a brakes the rotor 38a if an operator reduces a setpoint rotational speed. In addition, the computing unit 34a brakes the rotor 38a if an operator sets the setpoint rotational speed to zero. In addition, the computing unit 34a switches the electric motor 30a off if it detects a load jump at the tool spindle 12a which goes beyond a limiting value. Such a load jump occurs, in particular, when the inserted tool 26a cants. Alternatively, a computing unit 34a could brake the rotor 38a of the electric motor 30a in this case.

The hand-held power tool housing 20a of the hand-held power tool 10a surrounds the electric motor 30a without a ventilation opening. The hand-held power tool housing 20a carries waste heat of the electric motor 30a to a surface of the hand-held power tool housing 20a through thermal conduction. The hand-held power tool housing 20a has a sealing means (not illustrated in more detail). The sealing means prevents liquid, air moisture, air, dust and dirt penetrating an interior space 44a of the hand-held power tool housing 20a.

The hand-held power tool housing 20a has four housing elements 46a, 48a, 50a, 52a. A first and a second of the housing elements 46a, 48a are embodied as half-shells. The first and second housing elements 46a, 48a extend parallel to a rotational axis 54a of the tool spindle 12a along the accumulator 18a, the drive unit 14a and the tool spindle 12a. The first and second housing elements 46a, 48a are connected to one another along a plane which runs parallel to a rotational axis 54a of the tool spindle 12a. The first and second housing elements 46a, 48a are laser-welded to one another. The third housing element 50a bounds the interior space 44a of the hand-held power tool housing 20a on a side facing away from the tool clamping chuck 16a. The fourth housing element 52a bounds the interior space 44a of the hand-held power tool housing 20a on a side facing the tool clamping chuck 16a. For this purpose, the third and fourth housing elements 50a, 52a surround the first and second housing elements 46a, 48a in each case partially on one plane in each case, said plane being oriented perpendicularly with respect to the rotational axis 54a. The third and fourth housing elements 50a, 52a are therefore embodied as covers. The third and fourth housing elements 50a, 52a are laser-welded to the first and second housing elements 46a, 48a. As a result, it is possible to dispense with a screw connection in the case of the hand-held power tool housing 20a.

Figure 4:
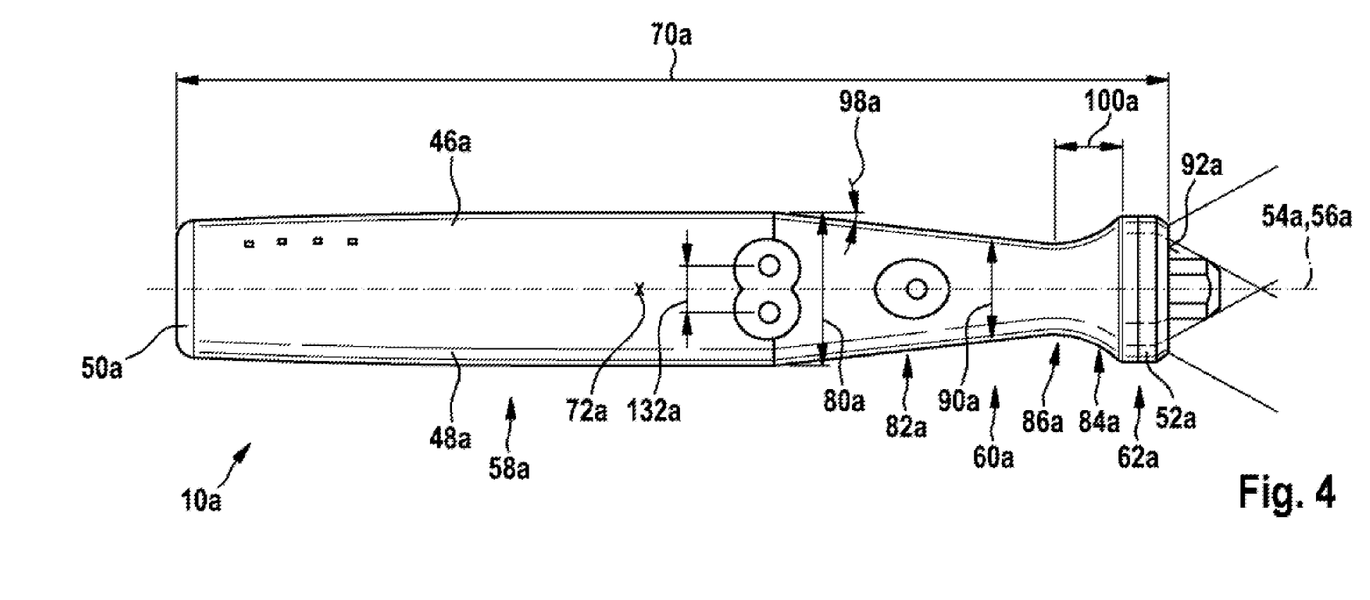
FIG. 4 shows a side view of the hand-held power tool from FIG. 1.
Figure 5:
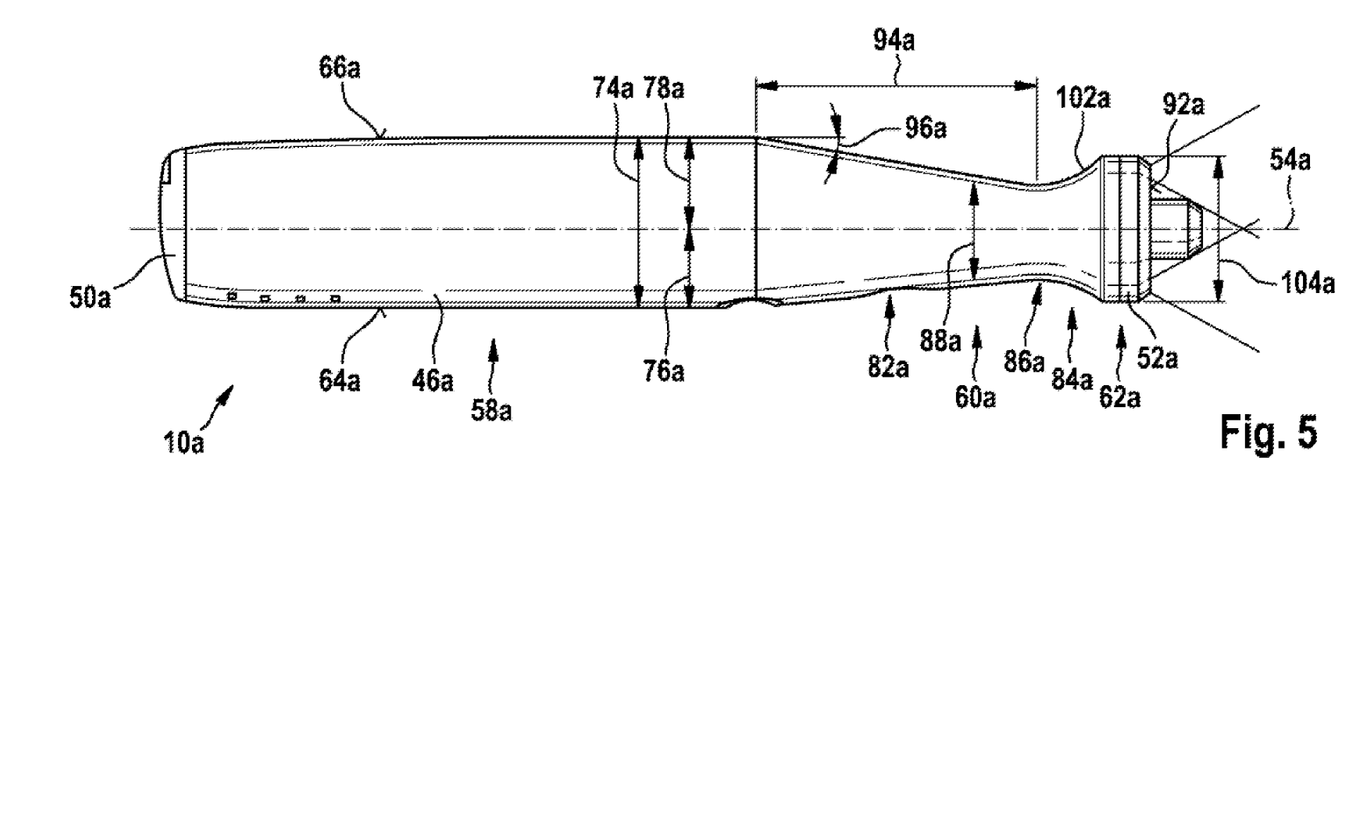
FIG. 5 shows a plan view of the hand-held power tool from FIG. 1.

FIG. 4 shows the hand-held power tool 10a in a plan view. FIG. 5 shows the hand-held power tool 10a in a side view. The hand-held power tool housing 20a has a plane 56a of symmetry which runs parallel to the rotational axis 54a of the tool spindle 12a. The hand-held power tool housing 20a comprises an accumulator region 58a, a gripping region 60a and a lighting unit region 62a. The hand-held power tool housing 10a has an oval cross section perpendicularly with respect to the rotational axis 54a. The hand-held power tool housing 10a comprises an upper side 64a and a lower side 66a. An operator control unit 68a of the hand-held power tool 10a is arranged on the upper side 64a. The hand-held power tool housing 10a has an overall length 70a parallel to a rotational axis 54a of less than 250 mm. Here, the overall length is 180 mm. The hand-held power tool 10a has an overall weight which is less than 150 g. The overall weight is 128 g here. A center of gravity 72a of the hand-held power tool 10a is less than 40 mm away from the operator control unit 68a of the hand-held power tool 10a in the axial direction. Here, the center of gravity 72a of the hand-held power tool 10a is 30 mm away from the operator control unit 68a in the axial direction facing away from the tool clamping chuck 16a.

The accumulator region 58a has, on an accumulator plane, a diameter of less than 35 mm. The accumulator plane intersects the accumulator 18a and is oriented perpendicularly with respect to the rotational axis 54a. Here, the accumulator region 58a has, on the accumulator plane parallel to the plane 56a of symmetry, a diameter 74a of approximately 29 mm. The upper side 64a is at a distance 76a of 13 mm from the rotational axis 54a on the accumulator plane and parallel to the plane 56a of symmetry. The lower side 66a is at a distance 78a of 16 mm from the rotational axis 54a on the accumulator plane and parallel to the plane 56a of symmetry. The accumulator region 58a has a diameter 80a of 26 mm perpendicularly with respect to the plane 56a of symmetry.

The grip region 60a has an elastic, slip-inhibiting gripping material on an outer side. The grip region 60a runs on average parallel to the rotational axis 54a of the tool spindle 12a. The grip region 60a comprises a tapering region 82a, a grip stop region 84a and a constriction maximum 86a. The constriction maximum 86a is arranged between the tapering region 82a and the grip stop region 84a. The tapering maximum 86a is arranged on a plane which is oriented perpendicularly with respect to the rotation axis 54a. The grip region has a minimum diameter 90a at the constriction maximum 86a. The diameter 88a at the constriction maximum 86a parallel to the plane 56a of symmetry is 16.1 mm. A diameter 90a at the constriction maximum 86a perpendicular to the plane 56a of symmetry is 15.6 mm. The constriction maximum 86a is arranged less than 22 mm away from a workpiece side 92a of the hand-held power tool housing 20a. In this exemplary embodiment, the constriction maximum is arranged 19 mm from the workpiece side 92a. Part of the grip region 60a is less than 10 mm away from the workpiece side 92a.

The tapering region 82a is arranged between the constriction maximum 86a and the accumulator region 58a. Said tapering region 82a has an extent 94a parallel to the rotational axis 54a of 50 mm. On the underside 66a, said tapering region 82a tapers at an angle 96a of 10 degrees relative to the accumulator region 58a. The tapering region 82a tapers at an angle 98a of approximately 6 degrees relative to the plane 56a of symmetry. The grip stop region 84a is arranged on a side of the constriction maximum 86a facing the tool clamping chuck 16a. Said grip stop region 84a has an extent 100a parallel to the rotational axis 54a of 11 mm. Said grip stop region 84a widens from the constriction maximum 86a in the direction of the tool clamping chuck 16a. Said grip stop region 84a widens in accordance with an elliptical curve 102a which appears appropriate to a person skilled in the art, here with elliptical axes of 11 mm or 19 mm, respectively. The grip stop region 84a has a maximum diameter 104a which is less than 1.2 times the diameter 88a, 90a of the constriction maximum 86a. Here, the grip stop region has the maximum diameter 104a, approximately 1.15 times as large as a diameter 88a, 90a of the constriction maximum 86a.

The lighting unit region 62a is arranged between the grip stop region 84a and the tool clamping chuck 16a. The lighting unit region 62a is configured in an essentially cylindrical shape. The lighting unit region 62a has a diameter 104a of 18.5 mm radially with respect to the rotational axis 54a. The diameter 104a of the lighting unit region 62a corresponds to the maximum diameter 104a of the grip stop region 84a. The lighting unit region 62a bounds the interior space 44a of the hand-held power tool housing 20a in the direction of the tool clamping chuck 16a. The lighting unit region 62a of the hand-held power tool housing 10a surrounds, on at least one plane perpendicular to the rotational axis 54a, a lighting unit 106a of the hand-held power tool 10a. In at least one operating state (not illustrated in more detail), the lighting unit 106a illuminates a work region of the workpiece.

Figure 6:
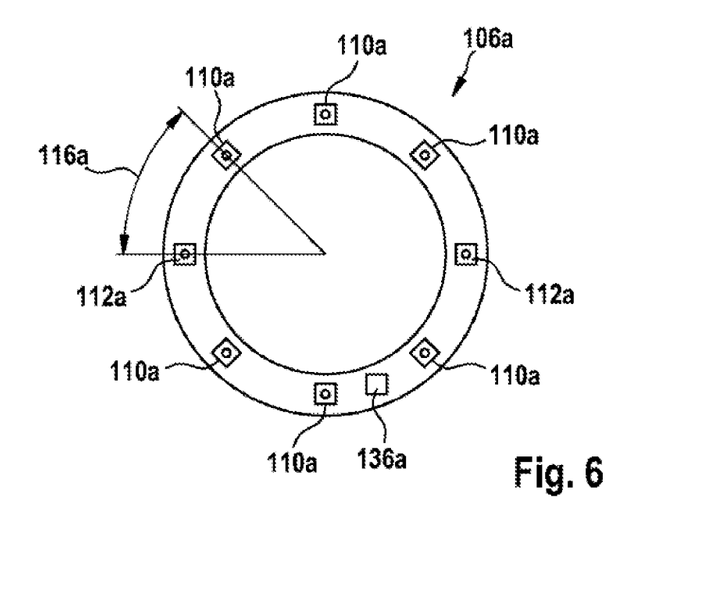
FIG. 6 shows part of a lighting unit of the hand-held power tool from FIG. 1.

The lighting unit 106a comprises an optical element 108a, which is partially embodied in one piece with the hand-held power tool housing 20a. To be precise, the optical element 108a is embodied in one piece with the fourth housing element 52a which bounds the interior space 44a of the hand-held power tool housing 20a on a side facing the tool clamping chuck 16a. The optical element 108a is therefore provided for attaching the first and second housing elements 46a, 48a. The fourth housing element 52a forms part of the lighting unit region 62a. The optical element 108a has lenses (not illustrated in more detail) which focus a luminous flux emitted by lighting means 110a, 112a of the lighting unit 106a. In addition, the optical element 108a has a diffuser (not illustrated in more detail) which during operation scatters the luminous flux, as a result of which a shadow of the inserted tool 26a has soft transitions. Alternatively, the optical element 108a could only have lenses and/or lenses could be embodied in one piece with a diffuser.

The lighting unit 106a has the eight lighting means 110a, 112a. In addition, the lighting unit 106a has a lighting means carrier 114a. The lighting means carrier 114a attaches the lighting means 110a, 112a with them arranged at an angle 116a of 45 degrees with respect to one another in relation to the tool spindle 54a on an axial plane of the tool spindle 54a. Said lighting means 110a, 112a are arranged distributed uniformly about the rotational axis 54a. The lighting means carrier 114a is embodied as a printed circuit board. Said lighting means carrier 114a has an annular shape. The lighting means carrier 114a surrounds the tool spindle 12a by 360 degrees on at least one plane.

The lighting unit 106a has a delay unit (not illustrated in more detail here) which, after switching off of the drive unit 14a, delays switching off of the lighting means 110a, 112a by provided time. The time can be adjusted by an operator. The delay unit is embodied as a computing routine of the computing unit 34a. The delay unit starts to dim the lighting means 110a, 112a, for example, two seconds after the switching off of the drive unit 14a. Within two seconds, the delay unit dims the lighting means 110a, 112a until they no longer emit any luminous flux.

The lighting means 110a, 112a are partially embodied as lighting means 110a which illuminate in white. In addition, the lighting means 110a, 112a are partially embodied as lighting means 112a which illuminate in a colored fashion. The lighting means 110a which illuminate in white are embodied as light emitting diodes which illuminate in white. The lighting means 112a which illuminate in a colored fashion are embodied as RGB light emitting diodes. That is to say they are provided for emitting red, green and blue light. In this exemplary embodiment, the lighting unit 106a has six lighting means 110a which illuminate in white and two lighting means 112a which illuminate in a colored fashion. The lighting means which illuminate in a colored fashion are provided for emitting light with different colors and with variable color components.

The hand-held power tool 10a has a display unit 118a. The lighting means 112a which illuminate in a colored fashion are part of the display unit 118a. The display unit 118a is therefore partially embodied in one piece with the lighting unit 106a. During operation, the lighting means 112a which illuminate in a colored fashion illuminate the work area in a color which is dependent on a characteristic variable in each case. The display unit 118a is therefore provided for outputting two different characteristic variables. The computing unit 34a controls the outputting of the characteristic variables. The operator can select which characteristic variable is to be output. In this context, it is also possible to output simultaneously a single characteristic variable of two lighting means 112a which illuminate in a colored fashion. Selectable characteristic variables are characteristic variables which appear appropriate to a person skilled in the art, but, in particular, a temperature of the drive unit 14a and/or of the accumulator 18a, a rotational speed of the tool spindle 12a, a state of charge of the accumulator 18a, a contact pressure of the inserted tool on the workpiece, the power consumption of the drive unit 14a and/or a temperature or warning about the state of charge when a threshold value is exceeded. The hand-held power tool 10a has a display (not illustrated in more detail), here an OLED display which displays to the operator the type of characteristic variable which is output. The hand-held power tool 10a has a temperature sensor 119a which measures a temperature of the electric motor 30a during operation.

The hand-held power tool 10a has a further display unit 120a which is arranged at an end of the hand-held power tool housing 20a facing away from the tool clamping chuck 16a. The further display unit 120a has four lighting means 122a which illuminate in green and four lighting means 124a which illuminate in red. Two lighting means 122a, 124a which illuminate in different colors each emit light through a cutout 126a in the hand-held power tool housing 10a. As an alternative to the two display units 118a, 120a, a hand-held power tool 10a could also have just one of the two display units 118a, 120a.

The hand-held power tool 10a has the operator control unit 68a with two operator control elements 128a, 130a. The hand-held power tool housing 20a attaches the operator control elements 128a, 130a. The first of the operator control elements 128a is embodied as a capacitive pushbutton key. During operation, the operator stops and starts a drive of the tool spindle 12a by means of the first operator control element 128a. The first operator control element 128a is arranged less than 30 mm away from the constriction maximum 86a of the grip region 60a, specifically 24 mm. The first operator control element 128a is arranged on the plane 56a of symmetry. The second of the operator control elements 130a comprises two capacitive pushbuttons. The two pushbuttons are at a distance 132a of 8 mm from one another and are arranged symmetrically with respect to the plane 56a of symmetry.

During operation, the operator can select a rotational speed of the tool spindle 12a by means of the second operator control element 130a. The second operator control element 130a is provided for outputting a characteristic variable for controlling a rotational speed of the tool spindle 12a. By simultaneously pressing the two pushbuttons, the operator can select a characteristic variable which is output to the display units 118a, 120a. The second operator control element 130a is arranged less than 80 mm away from the constriction maximum 86a of the grip region 60a, specifically 50 mm. The pushbuttons have only one nonactivated stable state, that is to say they do not latch in a depressed state. The operator control unit 68a detects an operator making contact without force. Alternatively or additionally, the operator control unit 68a could have partially movable pushbuttons, in particular with a mechanically closing contact.

The hand-held power tool 10a has a charging energy input 134a. The charging energy input 134a is embodied as a USB interface. The charging energy input 134a is arranged on a side of the hand-held power tool housing 20a facing away from the tool clamping chuck 16a. The charging energy input 134a is provided for transmitting data. To be precise, the computing unit 34a can be adjusted by means of a computer (not illustrated in more detail) using the charging energy input 134a. The operator can configure a rotational speed range which can be adjusted with the operator control elements 130a, configure a characteristic variable which is displayed by the lighting means 124a which illuminate in a colored fashion, and make other adjustments which appear appropriate to a person skilled in the art. In addition, the operator can transmit, via the charging energy input 134a, operational data which appear appropriate to the person skilled in the art, such as operating hours and/or working processes of the hand-held power tool 10a, from the hand-held power tool 10a to the computer.

The hand-held power tool 10a has a pressure sensor (not illustrated in more detail) which, during operation, detects a pressure of the inserted tool 26a on the workpiece. The pressure sensor is arranged on one of the bearings 24a of the tool spindle 12a. In one operating state, the display unit 118a displays a pressure applied to the workpiece by the inserted tool 26a. As a result, particularly precise processing of the workpiece is possible.

The hand-held power tool 10a has a proximity sensor 136a which detects the approach of the inserted tool 26a to the workpiece. The proximity sensor 136a is embodied as an optical sensor. As an alternative, a proximity sensor could be embodied as a capacitive sensor which detects a capacitance of the inserted tool 26a. When an approach is provided and can be adjusted, in particular, by an operator, the computing unit 34a starts the drive of the tool spindle 12a automatically. As a result, particularly comfortable work with frequent stops is possible, in particular in order to monitor a processing result. Alternatively or additionally, the hand-held power tool could have a movement sensor which detects the speed of a movement of the hand-held power tool 10a relative to the workpiece. In particular, a display unit could output the speed. Furthermore, the hand-held power tool could have an acceleration sensor, a gyroscope and/or a position sensor. In particular, a computing unit could be provided for determining a case of blocking of an inserted tool and/or information about a processing operation by means of these sensors and, in particular, for outputting the case of blocking and/or information by means of a display unit.

Figure 7:
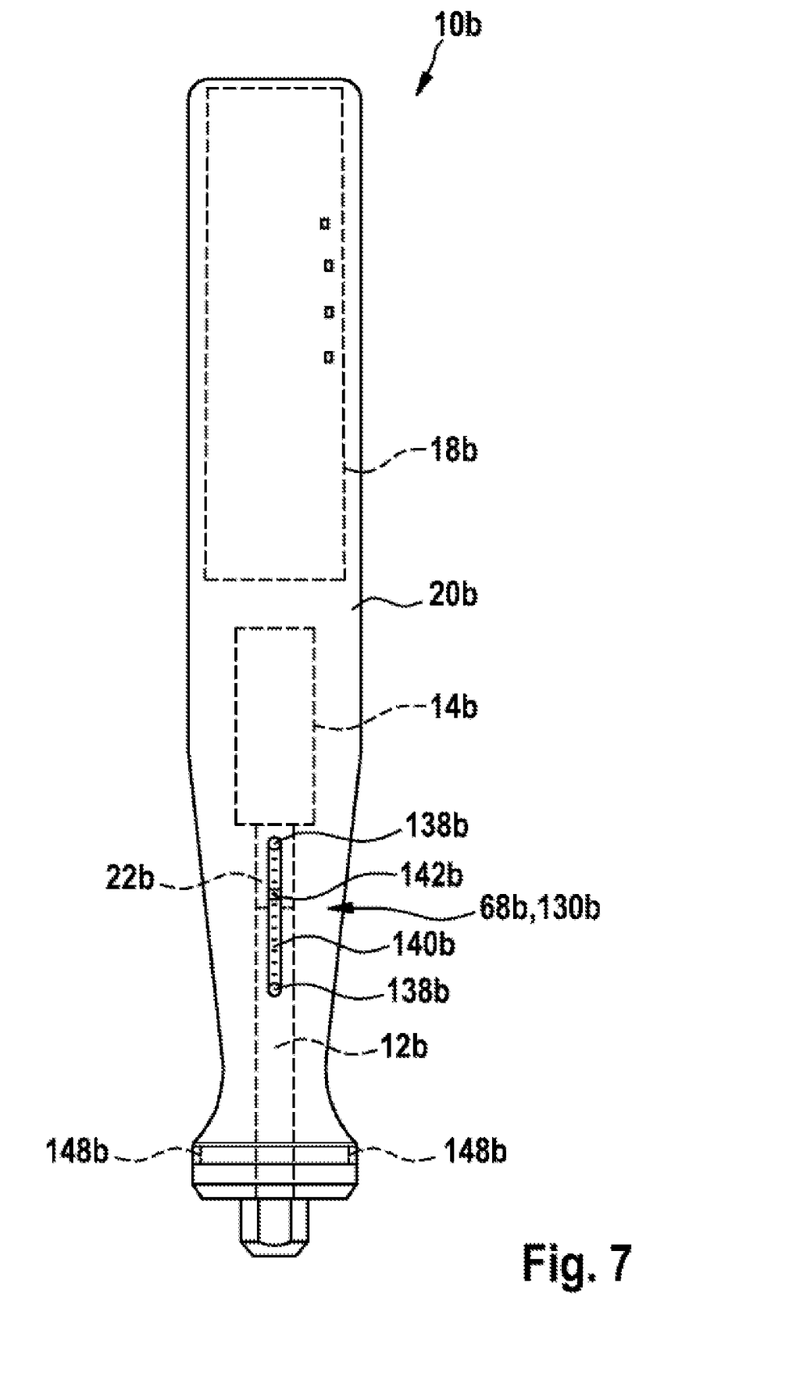
FIG. 7 shows an alternative exemplary embodiment of the hand-held power tool from FIG. 1.
Figure 8:
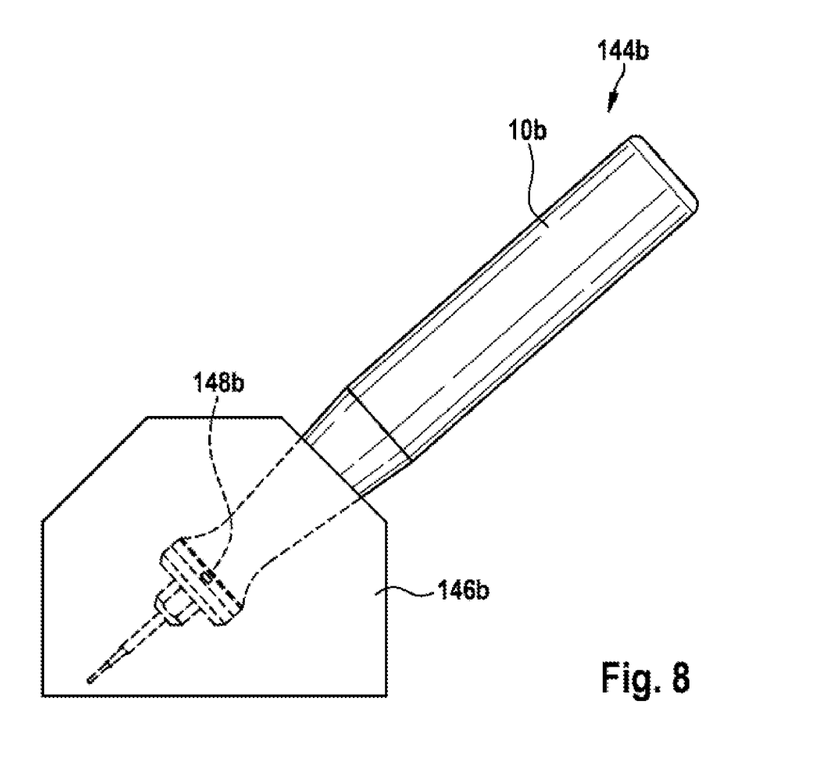
FIG. 8 shows a system with a hand-held power tool charger and the hand-held power tool from FIG. 7.

Two further exemplary embodiments of the disclosure are shown in FIGS. 7 and 8. The following descriptions and the drawings are restricted essentially to the differences between the exemplary embodiments, in which case reference can basically also be made to the drawings and/or to the description of the other exemplary embodiments in FIGS. 1 to 6 with respect to components which are denoted identically, in particular with respect to components with the same reference symbol. In order to differentiate between the exemplary embodiments, the letter a is positioned after the reference symbol from the exemplary embodiment in FIGS. 1 to 6. In the exemplary embodiment in FIGS. 7 and 8, the letter a is replaced by the letter b.

FIG. 7 shows a hand-held power tool 10b with a tool spindle 12b and a drive unit 14b. In one operating state, the drive unit 14b drives the tool spindle 12b at a rotational speed higher than 10 000 $\text{min}^{-1}$. The hand-held power tool 10b comprises an operator control unit 68b which, in the case of an operator action, detects an operator making contact without force. The operator control unit 68b already detects an approach of a body part of the operator. For this purpose, the operator control unit 68b has an operator control element 130b with two capacitive sensors 138b and an electrically conductive operator control interface 140b. The operator control interface 140b is embodied in a strip shape. It has a side ratio of greater than one to five. The sensors 138b detect where an operator touches the operator control interface 140b. This value is output by the sensors 138b as a characteristic variable of an operator control state. The operator control unit 68b is therefore provided for detecting more than three different operator control states. A computing unit 34b of the hand-held power tool 10b adjusts a setpoint rotational speed of the tool spindle 12b if the operator moves a contact point on the operator control interface 140b. The computing unit 34b starts or stops a drive of the tool spindle 12b if the operator taps the operator control interface 140b. The operator control unit 68b has a display unit 142b which during operation displays a selected characteristic variable of an operator control state. The display unit 142b backlights the operator control interface 140b.

FIG. 8 shows a system 144b with a hand-held power tool charger 146b and the hand-held power tool 10b. The hand-held power tool 10b has a charging energy input 134b with two charging contacts 148b. the charging energy input 134b is arranged on a side of the hand-held power tool housing 20b facing the tool clamping chuck 16b. When an accumulator 18b of the hand-held power tool 10b is charged, the hand-held power tool charger 146b makes contact with the charging contacts 148b. For this purpose, the hand-held power tool charger 146b has sprung contacts (not illustrated in more detail). During the charging of the hand-held power tool 10b, the hand-held power tool charger 146b transfers electrical energy to the hand-held power tool 10b via the charging contacts 148b. Alternatively or additionally, a hand-held power tool charger and hand-held power tool could each have a coil which transmit energy from the hand-held power tool charger to the hand-held power tool during a charging process.

The hand-held power tool charger 146b surrounds the hand-held power tool 10b by more than 180 degrees on a plane during a charging process. Here, the hand-held power tool charger 146b surrounds the hand-held power tool 10b by 360 degrees on the plane. The hand-held power tool charger 146b surrounds the hand-held power tool housing 20b of the hand-held power tool 10b on a side facing the tool clamping chuck 16b.

The invention claimed is:

1. A hand-held power tool, comprising:
   at least one tool spindle;
   an electrically commutated drive unit configured to drive the tool spindle at a rotational speed higher than 10 000 min$^{-1}$;
   a lithium-based accumulator configured to supply the electrically commutated drive unit with electrical energy; and
   at least one lighting unit having at least two lighting mechanisms configured to illuminate a work area,
   wherein the lighting mechanisms are arranged at an angle of less than 125 degrees with respect to one another in relation to the tool spindle on an axial plane of the tool spindle.

2. The hand-held power tool as claimed in claim 1, wherein the lighting unit surrounds the tool spindle by more than 90 degrees on at least one plane.

3. The hand-held power tool as claimed in claim 1, wherein the lighting unit has at least one delay unit configured to delay switching off the lighting unit by a provided time after switching off the electrically commutated drive unit.

4. The hand-held power tool as claimed in claim 1, wherein the lighting unit has at least one optical element configured to scatter a light beam of at least one of the lighting mechanisms.

5. The hand-held power tool as claimed in claim 1, wherein the lighting unit has an optical element configured to attach at least one housing element.

6. The hand-held power tool as claimed in claim 1, wherein the lighting mechanisms are configured to emit light with different colors.

7. The hand-held power tool as claimed in claim 1, further comprising a display unit configured at least partially in one piece with the lighting unit.

8. The hand-held power tool as claimed in claim 1, wherein the electrically commutated drive unit is connected in a gearless fashion to the tool spindle.

9. The hand-held power tool as claimed in claim 1, further comprising a hose coupling connecting the electrically commutated drive unit to the tool spindle.

10. The hand-held power tool as claimed in claim 1, wherein a first lighting mechanism of the at least two lighting mechanisms is configured to illuminate the work area with a light of a first color, and a second lighting mechanism of the at least two lighting mechanisms is configured to illuminate the work area with a light of a second color, the second color a color different from the first color.

11. The hand-held power tool as claimed in claim 10, further comprising:
    a computing unit operably connected to the first and the second lighting mechanisms, the computing unit configured to control the first and the second lighting mechanisms based upon a respective first and second characteristic variable.

12. The hand-held power tool as claimed in claim 11, wherein the first characteristic variable is a temperature of the electrically commutated drive unit.

13. The hand-held power tool as claimed in claim 11, wherein the first characteristic variable is a rotational speed of the electrically commutated drive unit.

14. The hand-held power tool as claimed in claim 11, wherein the first characteristic variable is a state of charge of the lithium-based accumulator.

15. The hand-held power tool as claimed in claim 11, wherein the first characteristic variable is a temperature of the lithium-based accumulator.

* * * * *

UNITED STATES PATENT AND TRADEMARK OFFICE
CERTIFICATE OF CORRECTION

PATENT NO. : 9,539,691 B2  
APPLICATION NO. : 14/125524  
DATED : January 10, 2017  
INVENTOR(S) : Hirschburger Page 1 of 1

It is certified that error appears in the above-identified patent and that said Letters Patent is hereby corrected as shown below:

On the Title Page

Item [75], Wolfgang Hirschburger's residence should read:
"Reutlingen (DE)"

Signed and Sealed this
First Day of August, 2017

Joseph Matal
*Performing the Functions and Duties of the*
*Under Secretary of Commerce for Intellectual Property and*
*Director of the United States Patent and Trademark Office*